US008229494B1

(12) United States Patent
Kela et al.

(10) Patent No.: US 8,229,494 B1
(45) Date of Patent: Jul. 24, 2012

(54) UPLINK TRANSMISSION POWER CONTROL MECHANISM

(75) Inventors: Petteri Kalle Kela, Kaarina (FI); Tommi Tapani Kangassuo, Salo (FI); Petteri Mika Heinonen, Aura kk (FI); Jonathan Michael Keast, Salo (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/287,549

(22) Filed: Nov. 2, 2011

Related U.S. Application Data

(63) Continuation of application No. 13/099,786, filed on May 3, 2011.

(30) Foreign Application Priority Data

May 3, 2011 (GB) .................................. 1107320.2

(51) Int. Cl.
*H04B 7/00* (2006.01)
(52) U.S. Cl. .......... 455/522; 455/67.11; 455/68; 455/69
(58) Field of Classification Search ............... 455/522, 455/67.11, 68–70, 115.3, 126, 127.1, 127.2, 455/135, 226.3, 227.2, 296; 370/318
See application file for complete search history.

(56) References Cited

U.S. PATENT DOCUMENTS

| 5,898,927 | A  | * | 4/1999  | Ishii et al. ..................... 455/450 |
| 6,411,799 | B1 | * | 6/2002  | Padovani ........................ 455/69 |
| 6,671,266 | B1 | * | 12/2003 | Moon et al. ..................... 370/342 |
| 7,643,845 | B2 | * | 1/2010  | Okumura et al. ............. 455/522 |
| 7,881,256 | B2 | * | 2/2011  | Jou et al. ........................ 370/329 |
| 7,983,708 | B2 | * | 7/2011  | Mehrabanzad et al. ...... 455/522 |
| 2001/0036221 | A1 | * | 11/2001 | Sato .............................. 375/147 |
| 2002/0111163 | A1 | * | 8/2002  | Hamabe ......................... 455/425 |
| 2003/0100269 | A1 | * | 5/2003  | Lehtinen et al. ................ 455/69 |

(Continued)

FOREIGN PATENT DOCUMENTS

WO   WO 00/62441   10/2000

(Continued)

OTHER PUBLICATIONS

Search Report for GB Application No. 1107320.2, dated Jul. 7, 2011.

(Continued)

*Primary Examiner* — Dominic E Rego
(74) *Attorney, Agent, or Firm* — Alston & Bird LLP

(57) ABSTRACT

There is provided a mechanism for uplink transmission power control in a communication network. An uplink transmission power for a transmission from a communication network element to a communication network control element is calculated. When a transmission power control command from the communication network control element is received instructing an increase or a decrease of the uplink transmission power, it is checked whether the calculated uplink transmission power is above a maximum transmission power or below a minimum transmission power of the communication network element. If so, and the transmission power control command instructs a change in the opposite direction, power control adjustment is conducted by determining and conducting a correction for immediately compensating for a difference between the calculated uplink transmission power and the maximum/minimum transmission power, wherein an actual transmission power is set based on the correction parameter considering the received transmission power control command.

25 Claims, 7 Drawing Sheets

U.S. PATENT DOCUMENTS

| | | | |
|---|---|---|---|
| 2004/0087328 A1* | 5/2004 | Ronkainen | 455/522 |
| 2005/0083999 A1 | 4/2005 | Koo et al. | |
| 2006/0018347 A1* | 1/2006 | Agrawal | 370/537 |
| 2006/0035660 A1* | 2/2006 | Anderson | 455/522 |
| 2008/0004064 A1* | 1/2008 | Sakurai et al. | 455/522 |
| 2009/0111400 A1* | 4/2009 | Kazmi et al. | 455/127.1 |
| 2009/0117931 A1 | 5/2009 | Shin et al. | |
| 2009/0190485 A1* | 7/2009 | Bjorkegren et al. | 370/252 |
| 2009/0227249 A1* | 9/2009 | Ylitalo | 455/424 |
| 2009/0248303 A1* | 10/2009 | Tai | 701/214 |
| 2010/0105336 A1* | 4/2010 | Attar et al. | 455/67.11 |
| 2010/0238895 A1* | 9/2010 | Nakatsugawa et al. | 370/329 |
| 2010/0285830 A1 | 11/2010 | Englund et al. | |
| 2010/0303030 A1* | 12/2010 | Andersson | 370/329 |
| 2010/0323744 A1* | 12/2010 | Kim et al. | 455/522 |
| 2011/0003561 A1* | 1/2011 | Miao et al. | 455/69 |
| 2011/0021197 A1* | 1/2011 | Ngai | 455/436 |
| 2011/0159911 A1 | 6/2011 | Chen et al. | |
| 2011/0223964 A1* | 9/2011 | Ebiko | 455/522 |
| 2012/0083264 A1* | 4/2012 | Ramasamy et al. | 455/425 |

FOREIGN PATENT DOCUMENTS

WO    WO 2009/096830 A1    8/2009

OTHER PUBLICATIONS

3GPP TS 36.321 V9.3.0 (Jun. 2010); 3rd Generation Partnership Project; Technical Specification Group Radio Access Network; Evolved Universal Terrestrial Radio Access (E-UTRA); Medium Access Control (MAC) protocol specification (Release 9).

3GPP TS 36.213 V9.3.0 (Sep. 2010); 3rd Generation Partnership; Technical Specification Group Radio Access Network; Evolved Universal Terrestrial Radio Access (E-UTRA); Physical layer procedures; (Release 9).

* cited by examiner

UPLINK TRANSMISSION POWER CONTROL MECHANISM

CROSS REFERENCE TO RELATED APPLICATIONS

This application is a continuation of U.S. Application No. 13/099,786, filed May 3, 2011, which is hereby incorporated herein in its entirety by reference. This application also claims the benefit of United Kingdom application number GB1107320.2, filed on May 3, 2011.

BACKGROUND OF THE INVENTION

1. Field of the Invention

The present invention relates to a mechanism usable for controlling an uplink transmission power for a transmission from a communication network element, such as a user equipment or UE, to a communication network control element, such as a base station or eNB. In particular, the present invention is related to an apparatus, method and computer program product providing a transmission power control scheme for transmissions via uplink shared and control channels considering rapid changes in parameters used for calculating a transmission power when adjusting the transmission power.

2. Related background Art

Prior art which is related to this technical field can e.g. be found by the technical specification 3GPP TS 36.213, for example according to version 9.3.0, or 3GPP TS 36.321, for example according to version 9.3.0.

The following meanings for the abbreviations used in this specification apply:

| | |
|---|---|
| eNB: | evolved Node B |
| E-UTRAN: | evolved Universal Terrestrial Radio Access Network |
| LTE: | Long Term Evolution |
| LTE-A: | LTE Advanced |
| PL: | Path Loss |
| PUCCH: | Physical Uplink Control Channel |
| PUSCH: | Physical Uplink Shared Channel |
| RAR: | Random Access Response |
| SRS: | Sounding Reference Symbol |
| TPC: | Transmission Power Control |
| Tx: | Transmitter |
| UE: | User Equipment |
| UTRAN: | Universal Terrestrial Radio Access Network |

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

In communication networks, in particular wireless communication networks, the setting of transmission powers for signaling between the entities of the communication network is an important aspect. For this purpose, several power control algorithms and schemes are proposed and developed for the various communication network types which are commonly known to a person skilled in the art and are thus not discussed here for the sake of simplicity.

Basically, for communications from a communication network element, such as a UE, to a communication network control element, such as a base station or eNB, the communication network element may be configured to conduct an uplink transmission power control processing on the basis of power control algorithms for setting and adjusting a transmission power for transmissions by different channels, such as a shared channel or a control channel. The communication network control element, when receiving a signaling, can detect whether the transmission power from the UE is sufficient, and then send a transmission power control command in order to let the UE increase, decrease or maintain the present uplink transmission power.

However, there may be situations in which a transmission power used by the UE is not changed in accordance with a TPC command received from a base station or eNB even though the UE has properly received the TPC.

SUMMARY OF THE INVENTION

It is an object of the invention to provide an apparatus, method and computer program product by means of which an improved uplink transmission power control can be executed which assures that a communication network element such as a UE reacts immediately to a TPC command received from the communication network control element, such as the eNB.

This object is achieved by the measures defined in the attached claims.

According to an example of an embodiment of the proposed solution, there is provided, for example, an apparatus comprising a receiver configured to receive a transmission power control command from a communication network control element, the transmission power control command instructs one of an increase of an uplink transmission power, a decrease of the uplink transmission power, and a maintenance of the uplink transmission power, a transmission power calculating processing portion configured to calculate an uplink transmission power for a transmission from a communication network element to the communication network control element, a power control adjustment processing portion configured to determine whether the calculated uplink transmission power is above a first threshold value for a transmission power of the communication network element or below a second threshold value for a transmission power of the communication network element, the first threshold value being greater than the second threshold value, wherein, in case it is determined that the calculated uplink transmission power is above the first threshold value or below the second threshold value, the power control adjustment processing portion is further configured to determine and conduct a correction for immediately compensating for a difference between the calculated uplink transmission power and the first or second threshold value, and to set an actual transmission power on the basis of the correction by considering the received transmission power control command.

Furthermore, according to an example of an embodiment of the proposed solution, there is provided, for example, a method comprising receiving a transmission power control command from a communication network control element, the transmission power control command instructs one of an increase of an uplink transmission power, a decrease of the uplink transmission power, and a maintenance of the uplink transmission power, calculating an uplink transmission power for a transmission from a communication network element to the communication network control element, conducting a power control adjustment comprising determining whether the calculated uplink transmission power is above a first threshold value for a transmission power of the communication network element or below a second threshold value for a transmission power of the communication network element, the first threshold value being greater than the second threshold value, wherein, in case it is determined that the calculated uplink transmission power is above the first threshold value or below the second threshold value, the power control adjustment further comprises determining and conducting a correction for immediately compensating for a difference between the calculated uplink transmission power and the first or second threshold value, and setting an actual transmission power on the basis of the correction by considering the received transmission power control command.

According to further refinements, the proposed apparatus or method may comprise at least one of the following:

in case a transmission power control command instructing a decrease of the uplink transmission power is received and the power control adjustment processing determines that the calculated uplink transmission power is above the first threshold value of the transmission power of the communication network element, the power control adjustment processing may be further configured to determine and conduct a correction which compensates for the positive surplus of the calculated uplink transmission power with regard to the first threshold value and considers the decrease of the uplink transmission power by a value corresponding to the received transmission power control command; alternatively, in case a transmission power control command instructing an increase of the uplink transmission power is increased and the power control adjustment processing determines that the calculated uplink transmission power is below the second threshold value of the transmission power of the communication network element, the power control adjustment processing may be further configured to determine and conduct a correction which compensates for the negative surplus of the calculated uplink transmission power with regard to the second threshold value and considers the increase of the uplink transmission power by a value corresponding to the received transmission power control command;

the correction may comprise a determination of a new accumulated power control state parameter;

the correction may be determined such that the actual transmission power is a value corresponding to the first threshold value of the transmission power minus a value corresponding to the received transmission power control command, or a value corresponding to the second threshold value of the transmission power plus a value corresponding to the received transmission power control command;

the calculated uplink transmission power may be above the first threshold value of the transmission power of the communication network element or below the second threshold value of the transmission power of the communication network element due to a rapid change of a transmission condition parameter affecting a calculation algorithm for the uplink transmission power;

the calculated uplink transmission power may be above the first threshold value of the transmission power of the communication network element due to a power ramping-up process executed during a random access procedure; in this case, the power ramping-up process may be executed during a preamble transmission phase of the random access procedure, wherein the calculated uplink transmission power may be related to a transmission power used for an uplink scheduled transmission and the transmission power control command may be received in a random access response; then, a power threshold value crossing determination process may determine, during an execution of the power ramping-up process, whether the calculated uplink transmission power exceeds the first threshold value of the transmission power of the communication network element, and determine whether the calculated uplink transmission power falls again to a new value being below the first threshold value of the transmission power of the communication network element before receiving the random access response, wherein in case the determinations are positive, the power threshold value crossing determination process may further continue a ramping-up of an applied uplink transmission power from the new value until either the first threshold value of the transmission power is reached again or until the random access response is received;

an activation indication from the communication network control element indicating whether the processing conducted by the power control adjustment processing portion is to be executed or not may be received and processed, and the power control adjustment processing may be activated or deactivated in accordance with the received activation indication;

the first threshold value may be a maximum transmission power of the communication network element, and the second threshold value may be a minimum transmission power of the communication network element;

the communication network element may be a user equipment and the communication network control element may be a base station or evolved node B of a communication system to which the user equipment has access.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an apparatus, method and computer program product by means of which a communication network element, such as a UE, can immediately react to TPC commands also in case a threshold, such as an uplink transmission power limit is reached. For example, in case an applied output transmission power is limited with a maximum Tx power threshold value, compared to a conventional transmission power control approach where possibly no direct effect to the output power by at least the first TPC commands can be seen, transmission power control according to the present invention provides a faster and possibly immediate reaction to the TPC command. The same applies in case the output power is limited with a minimum Tx power. Furthermore, it is not necessary to transmit unnecessary TPC commands, i.e. commands which are only necessary to achieve a state in the UE where it finally reacts to the TPC command, which decreases unnecessary band usage and hence improves network efficiency. In addition, since it is possible to achieve that the UE follows immediately and strictly the network's commanded power adjustment (i.e. the TPC commands), there is less unexpected interference from the UE. Additionally, power consumption decrease can be achieved.

In addition, in particular in a scenario of an initializing communication from the UE to the eNB, such as in case of a random access scenario or the like, it is possible to achieve an immediate response to TPC commands when a response from the communication network control element to a preamble transmission of the UE for achieving random access is received. While in a conventional transmission power control scheme used in such a random access scenario power calculation may result that a TPC commands received in the response message from the eNB for a transmission of a scheduled transmission following the preamble transmission can not be followed without delay (which results that the transmission power for the scheduled transmission, such as a Message 3 transmission sent after receiving the RAR, is not in accordance with the eNB's instruction), according to the present invention, a faster and more accurate response to commanded power adjustments for Message 3 (re)transmissions and following PUSCH transmissions is provided.

The above and still further objects, features and advantages of the invention will become more apparent upon referring to the description and the accompanying drawings.

DESCRIPTION OF PREFERRED EMBODIMENTS

Figure 1:
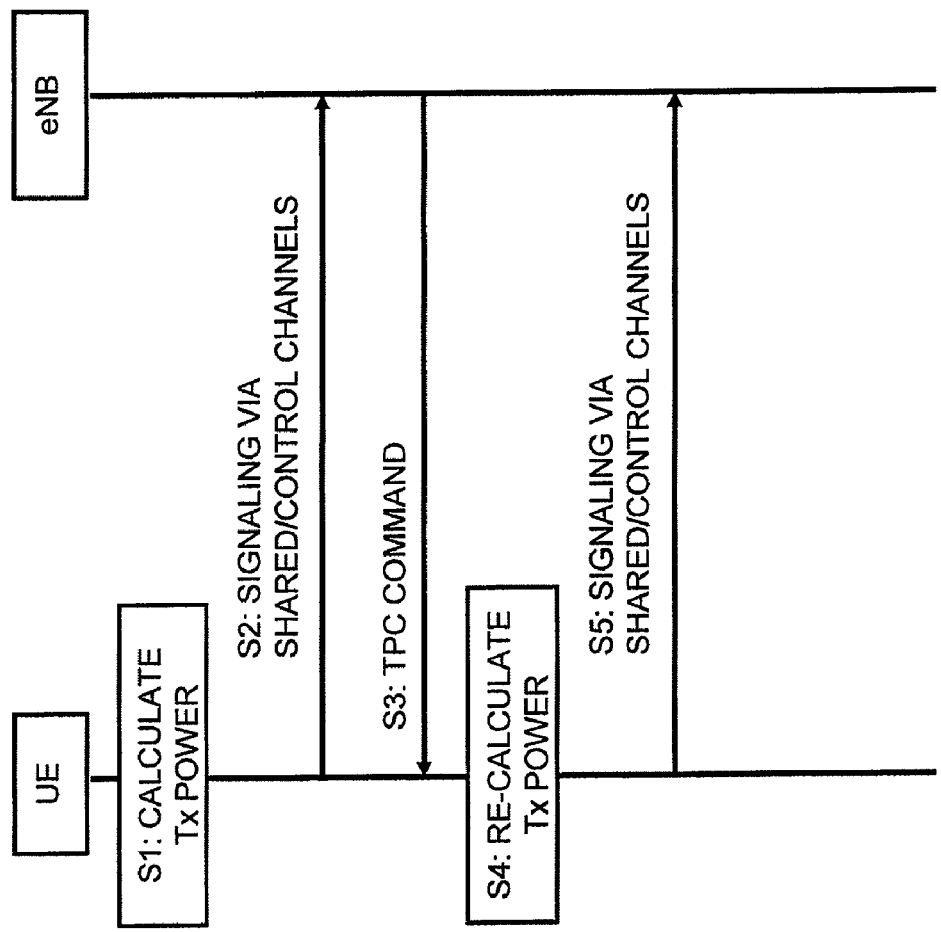
FIG. 1 shows a signaling diagram illustrating a general concept of a transmission power control scheme in a communication network.

In the following, examples and embodiments of the present invention are described with reference to the drawings. For illustrating the present invention, the examples and embodiments will be described in connection with a cellular communication system which may be based on a 3GPP LTE system. However, it is to be noted that the present invention is not limited to an application using such a communication system, but is also applicable in other types of communication systems and the like.

A basic system architecture of a communication network may comprise a commonly known architecture of a communication system comprising a wired or wireless access network subsystem and a core network. Such an architecture comprises one or more access network control elements, radio access network elements, access service network gateways or base transceiver stations, such as an eNB, with which a communication network element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like are usually comprised. The general functions and interconnections of those elements, depending on the actual network type, are known to those skilled in the art and described in corresponding specifications so that a detailed description thereof is omitted herein. However, it is to be noted that several additional network elements and signaling links may be employed for a communication connection to or from UEs, besides those described in detail herein below.

Furthermore, the described network elements, such as communication network elements like UEs or communication network control elements like eNBs (access network control elements or base stations), or the like, as well as corresponding functions as described herein may be implemented by software, e.g. by a computer program product for a computer, and/or by hardware. In any case, for executing their respective functions, correspondingly used devices and network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

In FIG. 1, a signaling diagram illustrating a general concept of a transmission power control scheme in a communication network comprising a UE and a eNB is shown. It is to be noted that the structure indicated in FIG. 1 shows only those network elements or parts which are necessary for understanding the principles underlying examples of embodiments of the invention. As known by those skilled in the art there may be several other network elements or devices involved in a communication connection between the UE and the communication network which are however omitted here for the sake of simplicity.

As can be seen in FIG. 1, in step S1, the UE calculates a transmission power for an uplink transmission (i.e. towards the eNB), e.g. an initial transmission power value, via one or more channels (e.g. shared channels like PUSCH or control channels like PUCCH). The transmission power calculation may be based on one or more algorithms considering several parameters for determining a suitable transmission power. Such transmission power calculation algorithms are known to those skilled in the art, and a specific example will be described below in further detail. The calculation of the transmission power in step S1 may also consider a TPC received in signaling exchanged with the eNB before step S1 (not shown).

When the uplink transmission power for the current transmission phase is calculated, the UE sends signaling to the eNB in step S2. The signaling may use one or more of the shared channels or control channels between the UE and the eNB, wherein the transmission power on each channel may vary. Examples of signaling according to step S2 may be, for example, a preamble transmission in a random access procedure, a scheduled transmission, or any other signaling between the communication network element UE and the communication network control element eNB.

In step S3, the eNB responds to the signaling in step S2. In this response, also an indication regarding an adjustment of the uplink transmission power used by the UE is included. This indication may be a TPC information element or command, which can indicate, for example, that the transmission power at the receiving end (the eNB) is not sufficient and has thus to be increased, or that the transmission power at the receiving end is sufficient and can thus be maintained, or that the transmission power at the receiving end is too high or causes interferences and has thus to be decreased.

In step S4, the UE re-calculates the transmission power in view of the current situation and by considering the TPC command received in step S3. That is, the UE may calculate a new transmission power value based on the current situation for the connection, wherein the instructed TPC value is considered to set an applied transmission power. Then, the UE adjusts the transmission power. Then, in step S5, a further signaling to the eNB is sent via channels wherein the re-calculated transmission power is used.

According to examples of embodiments of the invention, in the uplink transmission power control as described in connection with FIG. 1, the UE may calculate the transmission power while the eNB adjusts the UE's transmission power by sending TPC commands. The TPC commands are accumulated to a power control adjustment state of the UE.

Figure 2:
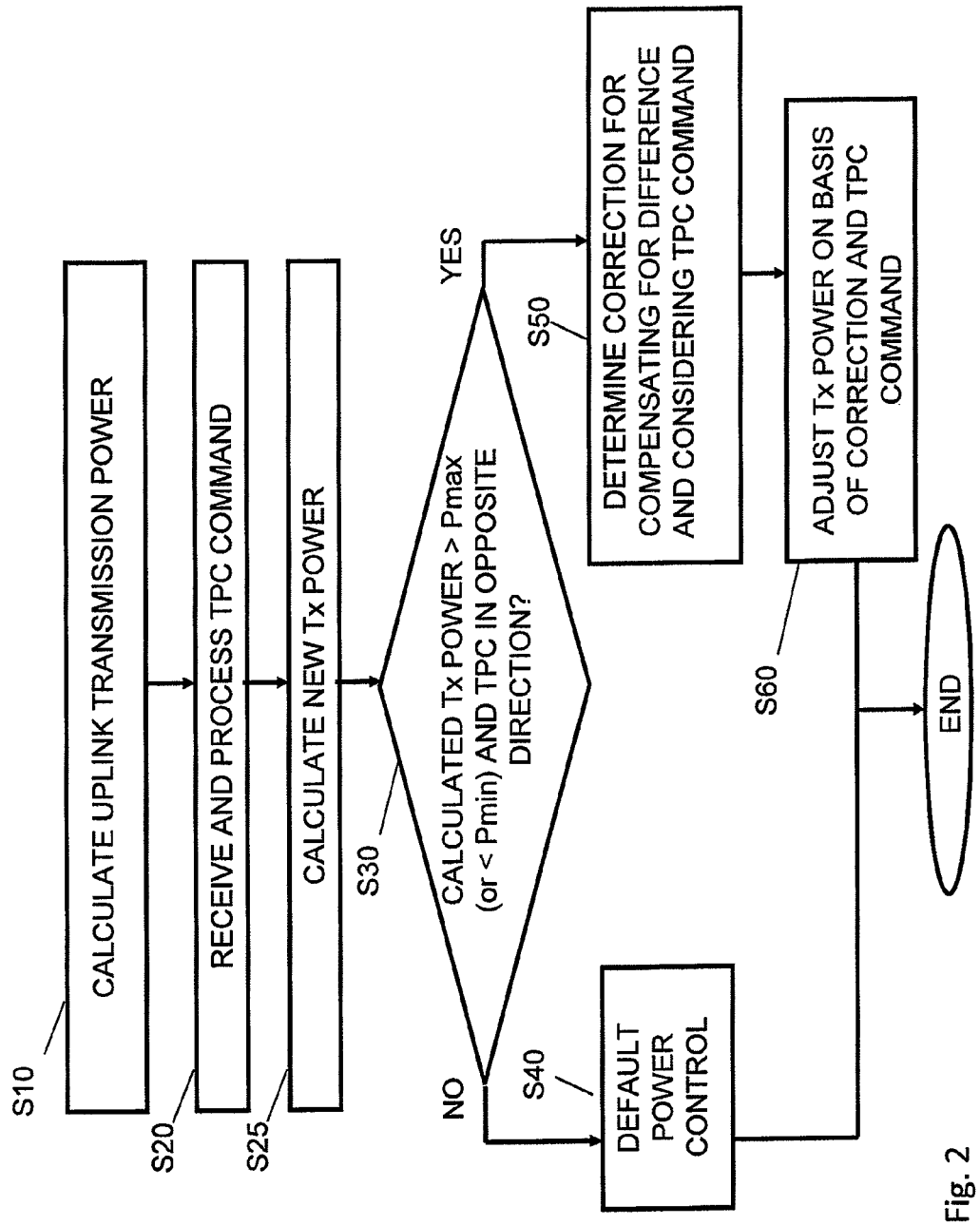
FIG. 2 shows a flow chart illustrating a transmission power control scheme according to examples of embodiments of the invention.

In FIG. 2, a flow chart illustrating a transmission power control scheme according to examples of embodiments of the invention is shown. The processing steps defined in FIG. 2 are implementable, for example, in steps S1 and S4 according to FIG. 1.

Specifically, in step S10, the UE calculates an uplink transmission power for a signaling to the eNB. This uplink transmission power may be an initial Tx power setting or may consider already received TPC commands in a preceding signaling from the eNB. On the basis of this transmission power calculation, an uplink transmission from the UE to the eNB is conducted which causes the eNB to sent back a TPC command, for example, in a response message or the like.

In step S20, the UE receives a message including a TPC command from the eNB. Specifically, the UE may receive a command instructing an increase or a decrease of the transmission power compared to the previous signaling.

In step S25, the UE calculates or determines a TX power calculation value in the current situation without considering the TPC value received in step S20. For example, similar to step S10, the UE calculates a new uplink Tx power value on the basis of transmission parameter like pathloss etc. at the present moment but without taking into account the instructed change of power indicated by the TPC command. Alternatively, the Tx power calculated in step S10 may be re-used as a new or currently assumed Tx power value.

In step S30, the UE starts a specific processing, which is also referred to as power control adjustment processing. Specifically, the UE checks whether the transmission power currently calculated or assumed in step S25 is above an upper threshold limiting the actual applied transmission power or below a lower threshold limiting the actual applied transmission power, wherein the effect of the received TPC command is also considered.

For example the UE determines whether the calculated transmission power would result in a transmission power level exceeding the maximum transmission power (Pmax). Furthermore, it is checked whether the direction of the power change instructed by the TPC is in the opposite direction, i.e. requires a decrease of the transmission power. Finally, it is determined whether the combination of the calculated transmission power and the TPC command would still be above the upper threshold limit.

Otherwise, the UE determines whether the calculated transmission power would result in a transmission power level being below the minimum transmission power (Pmin). Furthermore, it is checked whether the direction of the power change instructed by the TPC is in the opposite direction, i.e. requires an increase of the transmission power. Finally, it is determined whether the combination of the calculated transmission power and the TPC command would still be below the lower threshold limit.

In this case, i.e. when the UE determines that the calculated transmission power considering the instructed change would still be above (or below) the upper (lower) threshold, the result would be that the change of the transmission power instructed by the eNB would not take place.

Therefore, in case the determination in step S30 is positive (YES), the processing proceeds to step S50. In step S50, the UE determines and conducts a correction for the calculated transmission power. For example, a correction parameter or factor may be calculated, which is introduced in a calculation algorithm. Alternatively, the value of an existing parameter of the power calculation algorithm as used, for example, in step S25 is changed, e.g. increased or decreased. The result of the correction is such that it compensates for the difference between the calculated or assumed transmission power and the respective upper or lower threshold. The transmission power change instructed by the eNB (i.e. the TPC command) may be taken into account already in the correction amount (i.e. compensation by the difference and the TPC value), i.e. may be already considered in the compensation amount, or may be added (or subtracted) to the Tx power calculation result after the compensation for the difference. In both cases, the result is that the applied Tx power being previously set at the threshold value is actually changed for the next transmission by the instructed change amount.

On the basis of the determined correction and compensation value, the UE calculates then in step S60 a new transmission power value and adjusts the applied transmission power according to the TPC command.

In other words, by means of the correction determined and conducted in step S50, the calculated transmission power may be changed by a greater amount (in the positive or negative direction, depending on which threshold (upper or lower) is concerned) than instructed by the eNB in the TPC command. By means of this, the actual applied transmission power (which is currently at the set maximum or minimum threshold, for example) is changed as instructed by the eNB so that the eNB immediately receives signaling with a transmission power in accordance with the instructed change.

Otherwise, in case the determination in step S30 is negative (NO), i.e. the threshold is not exceeded or the TPC command would result in an even greater or lower transmission power (direction not opposite), then a default power control is executed in step S40, which may include a normal reduction or increase of the transmission power used for the uplink signaling, or ignoring of the TPC command.

Figure 3:
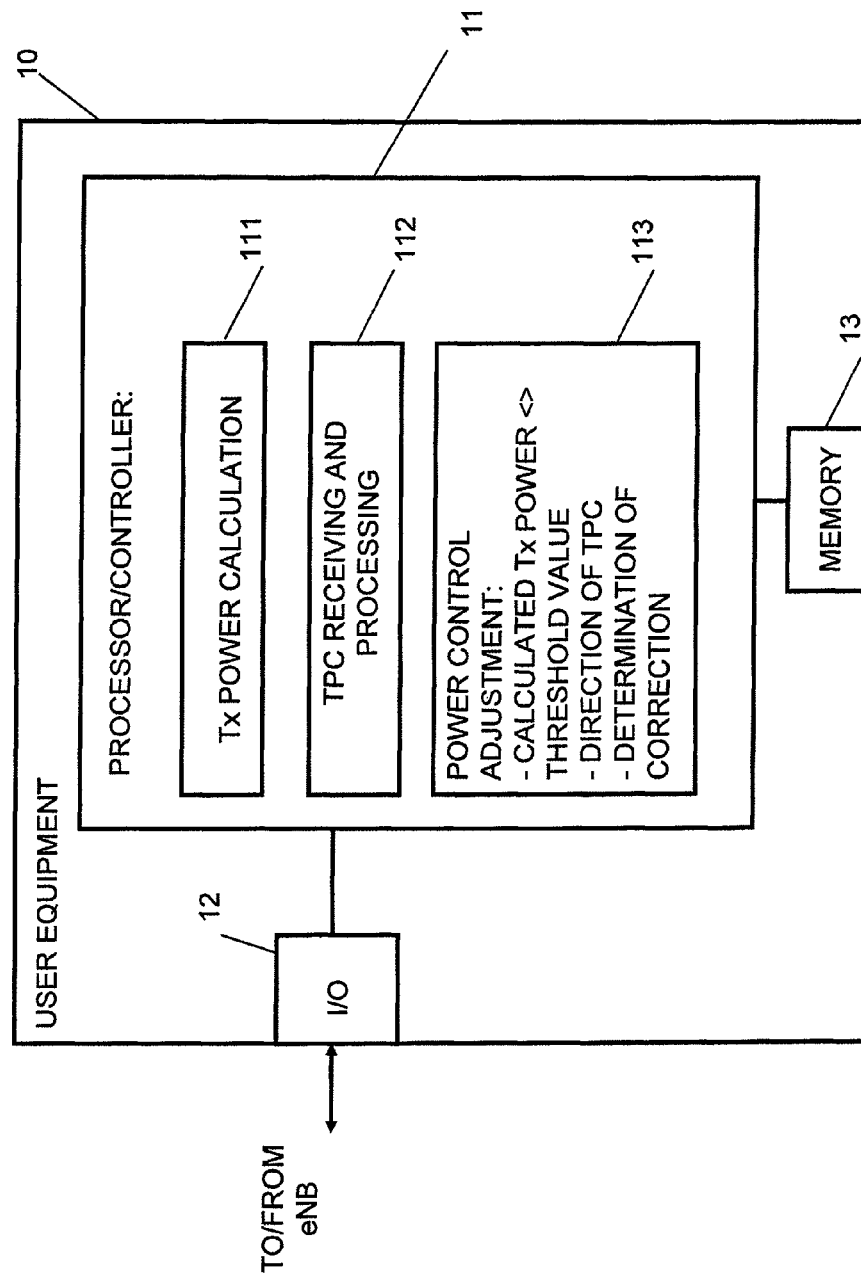
FIG. 3 shows a block circuit diagram of a communication network element including means according to examples of embodiments of the invention.

In FIG. 3, a block circuit diagram illustrating a configuration of a communication network element, such as a UE 10, is shown, which is configured to implement the processing as described in connection with FIG. 2, for example. It is to be noted that the communication network device or UE 10 shown in FIG. 3 may comprise several further elements or functions besides those described herein below, which are omitted herein for the sake of simplicity as they are not essential for understanding the invention. Furthermore, even though reference is made to a UE, the communication network element may be also another device having a similar function, such as a modem chipset, a chip, a module etc., which can also be part of a UE or attached as a separate element to a UE, or the like.

The communication network element or UE 10 may comprise a processing function or processor 11, such as a CPU or the like, which executes instructions given by programs or the like related to the power control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 12 denote a transceiver or input/output (I/O) unit connected to the processor 11. The I/O unit 12 may be used for communicating with other network elements, such as a communication network control element (not shown) like an eNB.

The I/O unit 12 may be a combined unit comprising communication equipment towards several of the network element in question, or may comprise a distributed structure with a plurality of different interfaces for each network element in question. Reference sign 13 denotes a memory usable, for example, for storing data and programs to be executed by the processor 11 and/or as a working storage of the processor 11.

The processor 11 is configured to execute processing related to the above described sensor network information collection mechanism. In particular, the processor 11 comprises a sub-portion 111 as a processing portion which is usable as a transmission power calculating processing portion for calculating an uplink transmission power on the basis of a suitable power calculation algorithm or the like. The portion 111 may be configured to perform processing according to steps S1 and S4 according to FIG. 1 or steps S10, S25 and S60 according to FIG. 2, for example. Furthermore, the processor 11 comprises a sub-portion 112 as a processing portion which is usable as a receiving and processing portion for the TPC command sent by the eNB, for example, according to step S2 of FIG. 1 or step S20 of FIG. 2. Moreover, the processor 11 comprises a sub-portion 113 as a processing portion which is usable as a power control adjustment processing portion. The power control adjustment processing portion 113 is usable, for example, to check whether the calculated transmission power is above an upper threshold limiting the actual applied transmission power or below a lower threshold limiting the actual applied transmission power, wherein the effect of the received TPC command (i.e. increase or decrease of transmission power, or direction of change of transmission power) is also considered, to determine a correction (calculation of compensation value, or correction parameter/factor) for the transmission power calculation conducted by sub-portion 111, according to steps S30 and S50 of FIG. 2.

In the following, examples of embodiments of the invention are described for explaining an application of the transmission power calculation scheme described above.

First, an example is described where the situation is assumed that a result of the transmission power control calculation algorithm would exceed a specific threshold value set for the transmission power. Specifically, in the present example, a communication network element such as a UE (the UE 10) may have set a maximum and/or minimum transmission power threshold which is the maximum or minimum limit for an adjustment of the (uplink) transmission power.

However, in case the upper or lower transmission power limit is already reached, it may occur that another parameter affecting the calculation algorithm, for example a pathloss parameter or the like, is subjected to a rapid change which will then also affect the result of the calculated transmission power, i.e. the result of the transmission power calculation algorithm used in the UE. That is, in certain environments the UE may end up having the power control adjustment state such that TPC commands are not affecting to the transmission power immediately as they should. If upper or lower transmission power limit is reached and parameter affecting the calculation (for example pathloss) changes rapidly, the result may be that the application of the conventional power control adjustment state represent a limiting factor in the adjustment of the applied transmission power. For example, it may be possible that several TPC commands have to be transmitted to the UE before the uplink transmission power is actually changed.

Figure 4:
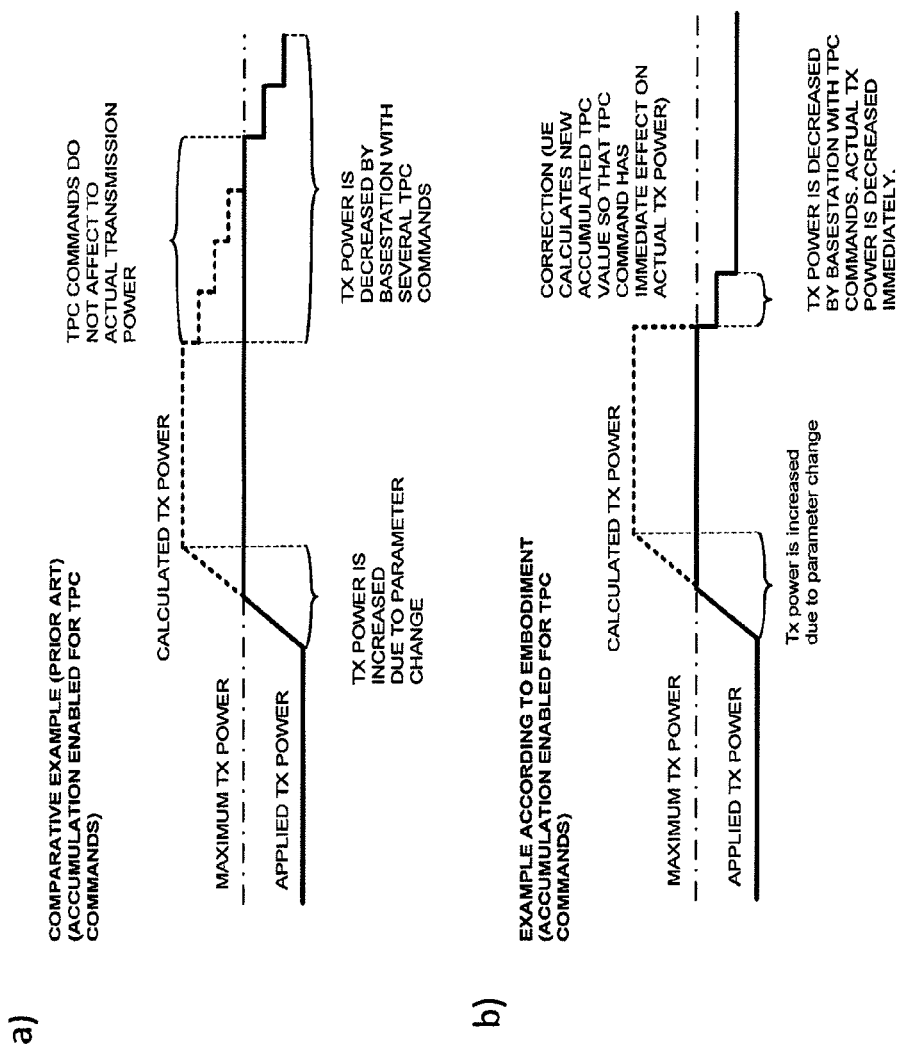
FIGS. 4a and 4b show diagrams explaining a result of an uplink transmission power control scheme according to a comparative example and according to an example of an embodiment of the invention in case the calculation of the transmission power is affected by a rapid change of at least one parameter used in the calculation algorithm.

The above situation and the effect of the application of the transmission power control scheme according to examples of embodiments of the invention will be further explained in connection with the examples shown in FIGS. 4a and 4b, which show diagrams illustrating a result of an uplink transmission power control scheme according to a comparative example (FIG. 4a) and according to an example of an embodiment of the invention (FIG. 4b) in case the calculation of the transmission power is affected by a rapid change of at least one parameter used in the calculation algorithm, such as a rapid pathloss change. In FIGS. 4a and 4b, the applied transmission power is indicated by a solid line, the calculated transmission power is indicated by a dotted line, and the maximum transmission power (threshold) is indicated by a chain-dotted line.

Assuming that the UE implements a transmission power calculation based on the 3GPP LTE E-UTRAN principles, for example according to specification 3GPP TS 36.213, version 9.3.0 (which represent only one of plural possible example algorithms applicable in connection with examples of embodiments of the invention). Then, a transmission power for a subframe i where PUSCH/PUCCH/SRS transmission should happen may be calculated according to the following formulas.

For example, the setting of the UE Tx power $P_{PUSCH}$ for PUSCH transmission in subframe i may be defined by $$P_{PUSCH}(i) \min\{P_{CMAX}, 10 \log_{10}(M_{PUSCH}(i)) + P_{O\_PUSCH}(j) + \alpha(j) \cdot PL + \Delta_{TF}(i) + f(i)\} [dBm]$$

where $P_{CMAX}$ is a configured UE transmitted power (maximum power); $M_{PUSCH}(i)$ is the bandwidth of the PUSCH resource assignment expressed in number of resource blocks valid for subframe i; $P_{O\_PUSCH}(j)$ is a parameter composed of the sum of a cell specific nominal component $P_{O\_PUSCH}$ provided from higher layers and a UE specific component $P_{O\_UE\_PUSCH}(j)$ provided by higher layers; for j=0 or 1, $\alpha \in \{0, 0.4, 0.5, 0.6, 0.7, 0.8, 0.9, 1\}$ is a 3-bit cell specific parameter provided by higher layers (for j=2, $\alpha(j)=1$); PL is the downlink pathloss estimate calculated in the UE in dB; $\Delta_{TF}(i)$ is a further parameter representing a modulation and coding scheme (MCS) dependent component; and f(i) represents the current power control adjustment state accumulated from received TPC commands (f(i)=f(i-1)+$\delta_{PUSCH}$(i-$K_{PUSCH}$) if accumulation is enabled, wherein $\delta_{PUSCH}$ is a UE specific correction value, also referred to as a TPC command and $K_{PUSCH}$ is a constant depending on the transmission type).

The setting of the UE Transmit power $P_{PUCCH}$ for the physical uplink control channel (PUCCH) transmission in subframe i may be defined by $$P_{PUCCH}(i) \min\{P_{CMAX}, P_{0\_PUCCH} + PL + h(n_{CQI}, n_{HARQ}) + \Delta_{F\_PUCCH}(F) + g(i)\} [dBm]$$

where $P_{CMAX}$ is the configured UE transmitted power (maximum power); $\Delta_{F\_PUCCH}(F)$ is provided by higher layers; $h(n_{CQI}, n_{HARQ})$ is a PUCCH format dependent value, where $n_{CQI}$ corresponds to the number of information bits for the channel quality information and $n_{HARQ}$ is the number of HARQ (hybrid automatic repeat request) bits; $P_{O\_PUCCH}$ is a parameter composed of the sum of a cell specific parameter $P_{O\_NOMINAL\_PUCCH}$ provided by higher layers and a UE specific component $P_{O\_UE\_PUCCH}$ provided by higher layers; and g(i) represents the current PUCCH power control adjustment state accumulated from received TPC commands.

The setting of the UE Tx power $P_{SRS}$ for the Sounding Reference Symbol transmitted on subframe i may be defined by:

$$P_{SRS}(i) = \min\{P_{CMAX}, P_{SRS\_OFFSET} + 10 \log_{10}(M_{SRS}) + P_{O\_PUSCH}(j) + \alpha(j) \cdot PL + f(i)\} [dBm]$$

where $P_{CMAX}$ is the configured UE transmitted power; $P_{SRS\_OFFSET}$ is a 4-bit UE specific parameter semi-statically configured by higher layers; $M_{SRS}$ is the bandwidth of the SRS transmission in subframe i expressed in number of resource blocks; f(i) is the current power control adjustment state for the PUSCH; $P_{O\_PUSCH}(j)$ and $\alpha(j)$ are parameters as defined for $P_{PUSCH}$ where j=1.

As indicated above, parameters f(i) and g(i) are the respective current power control adjustment state accumulated from received TPC commands. Furthermore, threshold values defined in the transmission power control scheme according to examples of embodiments of the invention as described above are represented in the E-UTRAN based example by a maximum or minimum power which, when reached by the UE, are not exceeded. That is, in case the UE received TPC commands instructing a further increase even though the upper transmission power threshold is reached shall not be accumulated to the current power control adjustment state. In practice this means that f(i)/g(i) is not accumulated with a corresponding TPC command if the output power calculation has reached the limit already with f(i-1)/g(i-1).

Referring to FIGS. 4a and 4b, it is assumed that at the beginning the calculated transmission power and the applied transmission power match to each other. Then, a parameter change (e.g. a pathloss or the like) changes rapidly, which causes that first both the calculated and the applied transmission power increase, in accordance with a used transmission power calculation algorithm. When reaching the maximum transmission power limit (Pmax), the applied transmission power is not increased anymore, while the calculated transmission power (caused by the parameters of the transmission power calculation algorithm) increases further.

In the comparative example according to FIG. 4a, when in this situation the output power is limited with maximum Tx power, an output power calculation will result to a level over the maximum power even in case received TPC commands instruct to decrease the accumulated power control adjustment state value (e.g. f(i)). In other words, there is no direct effect to the applied transmission power. Instead, the transmission of several TPC commands is necessary until an effect is achieved, as shown on the right side of FIG. 4a.

On the other hand, as shown in FIG. 4b, when applying the transmission power control scheme according to examples of embodiments of the invention, an immediate response can be achieved. As shown in FIG. 4b, in case the calculated Tx power is over the maximum threshold and negative TPC command (TPC with opposite direction) is received, the UE determines and conducts a correction, i.e. calculates a correction parameter or factor or changes an existing power calculation algorithm parameter, for example, which may be according to the present example a new accumulated power control adjustment state value. By means of this correction, the difference between the calculated and applied Tx powers can be compensated in a suitable manner and the applied Tx power is actually decreased in accordance with the TPC command.

As one possible example for implementing the transmission power control scheme, the UE may execute the following process described as a pseudo code before calculating and setting the Tx power (corresponding to steps S30 and S50 in FIG. 2). Specifically, the pseudo code describes a process where a situation as indicated in FIG. 4b is present, i.e. where the applied Tx power is at the upper power threshold (Pmax), and a received TPC command requests a reduction of the Tx power.

If(TPC command reduction request received && ((CalculatedPower_dB+StoredAccumulatedTPC_dB)>Pmax)) [this means that in case the TPC command instructs reduction of the TPC command and the sum of the calculated Tx power (in dB) which does not include a change according to the TPC command and the accumulated TPC commands is greater than Pmax, then the following is calculated]
{

StoredAccumulatedTPC_dB=StoredAccumulatedTPC_dB−(CalculatedPower_dB+StoredAccumulatedTPC_dB−Pmax)

} [which means that a new value for accumulated TPC commands is calculated by subtracting the value of Pmax from the sum of the calculated Tx power and the accumulated TPC commands]
wherein the CalculatedPower_dB represents the calculated or assumed Tx power without considering the recently received TPC value, StoredAccumulatedTPC_dB represents the parameter accumulated TPC command value, wherein the recalculated StoredAccumulatedTPC_dB may be used as a compensation factor or new f(i) in a power calculation algorithm as indicated above (i.e. a correction parameter or factor).

That is, according to examples of embodiments of the invention, a new value for accumulated power control adjustment state may be calculated as a correction parameter resulting that a received TPC command has an immediate effect on the applied Tx power level of the UE.

With the new value for accumulated power control adjustment state, the following calculation of the Tx power can be executed with the usual algorithm. As a result, the eNB is satisfied because the UE has reacted to it's commands immediately.

It is to be noted that the above determination of the correction parameter is only one possible example to implement the transmission power control algorithm according to examples of embodiments of the invention. Other examples may also be implemented as long as they enable that the Tx power is changed "more than the eNB asks". In other words, when a TPC command is received which would not otherwise affect to the actual used transmission power, the TPC command may be dynamically adjusted, for example.

Figure 5:
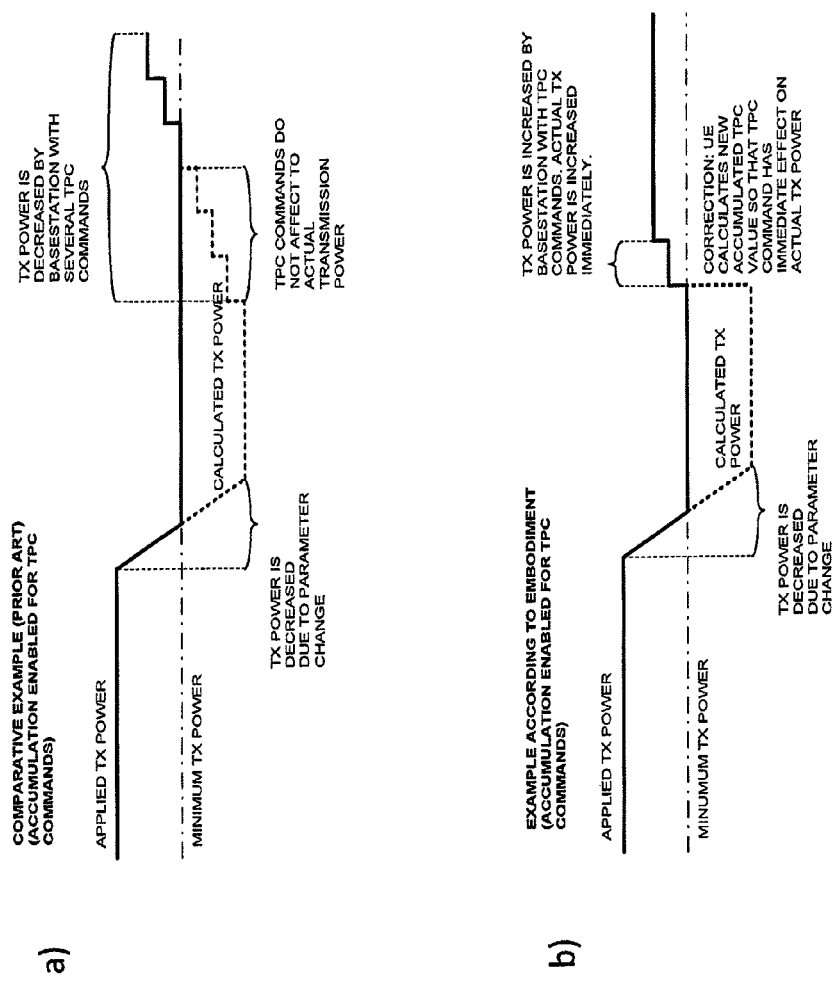
FIGS. 5a and 5b show diagrams explaining a result of an uplink transmission power control scheme according to a further comparative example and according to a further example of an embodiment of the invention in case the calculation of the transmission power is affected by a rapid change of at least one parameter used in the calculation algorithm.

FIGS. 5a and 5b show another implementation example of the transmission power control scheme according to examples of embodiments of the invention. In contrast to the examples shown in FIGS. 4a and 4b, in FIGS. 5a and 5b, diagrams illustrating a result of an uplink transmission power control scheme according to a comparative example (FIG. 5a) and according to an example of an embodiment of the invention (FIG. 5b) in case the calculation of the transmission power is affected by a rapid change of at least one parameter used in the calculation algorithm and the transmission power is at the minimum threshold, while a positive TPC command is received. In FIGS. 5a and 5b, the applied transmission power is indicated by a solid line, the calculated transmission power is indicated by a dotted line, and the minimum transmission power (threshold) is indicated by a chain-dotted line.

In the scenario according to FIGS. 5a and 5b, at the beginning the calculated transmission power and the applied transmission power match to each other. Then, a parameter change occurs leading to the situation that first both the calculated and the applied transmission power decrease, in accordance with a used transmission power calculation algorithm. When reaching the minimum transmission power limit (Pmin), the applied transmission power is not decreased anymore, while the calculated transmission power (caused by the parameters of the transmission power calculation algorithm) decreases further.

In the comparative example according to FIG. 5a, when in this situation the output power is limited with minimum Tx power, an output power calculation will result to a level under the minimum power even in case received TPC commands instruct to increase the accumulated power control adjustment state value (e.g. f(i)). In other words, there is no direct effect to the applied transmission power. Instead, the transmission of several TPC commands is necessary until an effect is achieved, as shown on the right side of FIG. 5a.

On the other hand, as shown in FIG. 5b, when applying the transmission power control scheme according to examples of embodiments of the invention, an immediate response can be achieved. As shown in FIG. 5b, in case the calculated Tx power is under the minimum threshold and a positive TPC command (TPC with opposite direction) is received, the UE determines and conducts a correction (e.g. a correction parameter or factor etc.), which may be according to the present example a new accumulated power control adjustment state value. By means of this correction, the difference between the calculated and applied Tx powers can be compensated in a suitable manner and the applied Tx power is actually increased in accordance with the TPC command.

It is also possible according to further examples of embodiments of the invention that the transmission power control scheme may be switched on or off according to an activation/deactivation instruction input in the UE. That is, for example, the communication network (e.g. eNB) may select whether the transmission power calculation scheme with the calculation of the correction parameter is to be conducted or not. For example, a corresponding activation/deactivation instruction may be transmitted to the UE in power control messages, which is processed by the UE in order to determine whether it is allowed or not to use the functionality. Thus, the communication network can control whether this behavior is allowed.

That is, according to examples of embodiments of the invention, a communication network element, such as the UE, is able to trigger (decide) to autonomously decrease/increase an accumulated TPC command dB value dynamically more than eNB asks, in case UE's calculated Tx power is over/under a maximum/minimum transmission power limit or threshold. Thus, the next received TPC command in the opposite direction (increasing in case of being under the minimum limit and decreasing in case of being over the maximum limit) has an immediate effect to the applied transmission power, so that the UE can directly react to TPC commands. There is also no need for unnecessary TPC commands, which would decrease unnecessary band usage, so that the overall network efficiency can be improved. Since the UE follows more strictly the network's commanded power adjustment, there is also less unexpected interference from the UE. Also a power consumption decrease can be achieved since the maximum power transmission state is not elongated unnecessarily.

Next, a further example of embodiments of the invention is described. In this example, a scenario where a random access procedure is conducted is assumed.

Figure 6:
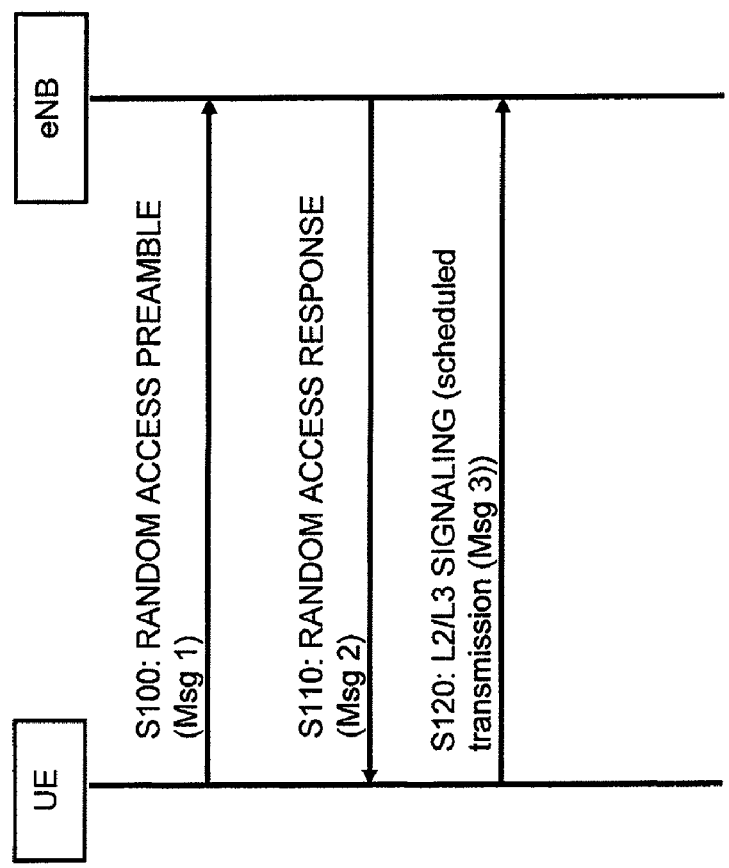
FIG. 6 shows a signaling diagram illustrating a random access procedure in a communication network.

FIG. 6 shows a signaling diagram illustrating a random access procedure in a communication network. It is to be noted that the structure indicated in FIG. 6 shows only those network elements or parts which are necessary for understanding the principles underlying examples of embodiments of the invention. As known by those skilled in the art there may be several other network elements or devices involved in a communication connection between the UE and the communication network which are however omitted here for the sake of simplicity.

As can be seen in FIG. 6, in step S100, the UE transmits a random access preamble (also referred to as Message 1), wherein a response to the preamble transmission is expected. In step S110, the eNB transmits a response to the preamble transmission, with is also referred to a RAR (Message 2). In this RAR, besides information regarding resource allocation for a Level2/Level3 (L2/L3) signaling (scheduled signaling or transmission, for example a first scheduled uplink transmission also, referred to as Message 3 according to E-UTRAN), also TPC command information is sent.

Based on the information provided in the RAR Message 2, the UE adjusts the setting for a transmission of L2/L3 signaling in step S120, for example a first scheduled uplink transmission or scheduled transmission like a Message 3 signaling, or another type of scheduled uplink transmission.

That is, for uplink transmission power control during the random access procedure, the UE calculates the transmission power for both preamble (Message 1) and Message 3 or another scheduled uplink transmission. Basically, parameters used in these calculations are affected by the number of preamble transmissions done before receiving the RAR, and from varying radio conditions (such as pathloss etc.). For example, the preamble transmission power can be increased with so-called ramp-up steps. When no RAR is received, the transmission power for the next preamble transmission is increased by a predefined step size, etc.

The transmission power set for the preamble transmission (i.e. Tx power for Message 1) may also affect the Tx power used for the L2/L3 signaling after receipt of the Message 2 (RAR). For example, the Message 3 or other scheduled uplink transmission power calculation may include the total ramp-up value from the preamble transmissions as a parameter in the calculation algorithm of the uplink transmission power.

The above situation and the effect of the application of a transmission power control scheme according to examples of embodiments of the invention will be further explained in connection with the examples shown in FIGS. 7a and 7b, which show diagrams illustrating results of an uplink transmission power control scheme in a random access procedure according to examples of an embodiment of the invention.

Assuming that an UE implements a transmission power calculation based on the 3GPP LTE E-UTRAN principles, for example according to specification 3GPP TS 36.213, version 9.3.0 (which represent only one of plural possible example algorithms applicable in connection with examples of embodiments of the invention). Then, a transmission power for a subframe i where a Message 3 (or other uplink scheduled) transmission using PUSCH should happen may be calculated according to the formula $$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} [dBm]$$

(as indicated above). In the random access procedure considered in the present example, $\alpha(j)=1$, wherein $f(i)=f(0)$ being the initial power control adjustment state calculated with the formula:

$$f(0) = \Delta P_{rampup} + \delta_{msg2}$$

where $\delta_{msg2}$ is the TPC command indicated in the random access response, and $\Delta P_{rampup}$ is provided by higher layers and corresponds to the total power ramp-up from the first to the last preamble transmission.

The preamble transmission power, on the other hand, may be calculated with a formula derived, for example, from the formula:

$$P_{PRACH} = \min\{P_{CMAX}, \text{PREAMBLE\_RECEIVED\_TARGET\_POWER} + PL\}\_[dBm]$$

wherein the parameter PREAMBLE_RECEIVED_TARGET_POWER may be calculated by using a following formula derived from specification 3GPP TS 36.321, version 9.3.0 (which represent only one of plural possible example algorithms applicable in connection with examples of embodiments of the invention):

preambleInitialReceivedTargetPower+DELTA_PREAMBLE+(PREAMBLE_TRANSMISSION_COUNTER−1)*powerRampingStep where powerRampingStep is a parameter in dB.

Under certain circumstances, the UE may have to send several preamble transmissions before receiving a RAR. That means that also several ramping up steps are executed, leading to a continuous increasing of the preamble transmission power, before receiving RAR from the base station.

As indicated above, the initial PUSCH power control adjustment state is set according to total preamble ramp-up added with a TPC command included in the RAR (Message 2). However, if the ramp-up value is too high (e.g. the calculated transmission power in the preamble transmission procedure has exceeded the upper limit for the allowable transmission power of the UE), the TPC command may have no effect on Message 3 (or other uplink scheduled) transmission power calculation as the maximum PUSCH transmission power limit is also reached. That means also that network controlled power adjustment with TPC commands may not have an immediate effect on the PUSCH transmission power since the calculated value may be over the maximum PUSCH transmission power limit.

In other words, there may be caused a delay in responding to a new, opposite direction TPC command, or it may be that the received TPC command has no effect in the actual Message 3 (or other uplink scheduled) transmission power calculation.

According to examples of embodiments of the invention, the UE is configured to trigger (decide) to autonomously decrease the accumulated TPC command dB value, calculated from UE autonomous stepping up of the transmission power of the preambles, when the calculated Tx power calculated by the UE is over a maximum transmission power limit. By means of this, the next received TPC command in opposite direction (e.g. when receiving the RAR or after the Message 3 (or other uplink scheduled signaling) has been transmitted) has an immediate effect on the applied transmission power.

For example, according to examples of embodiments of the invention, the total power ramp-up used in Message 3 (or other uplink scheduled) transmission power calculation is limited. When the Message 3 (or other uplink scheduled) transmission power is calculated after receiving the RAR, the initial power control adjustment state (e.g. the f(i) parameter value) is set so that power ramp-up steps exceeding the maximum transmission power limit are not taken into account. Thus, in case the transmission output power limit is reached during the preamble sending procedure, the rest of the power ramp-up steps (i.e. those power increasing steps which exceed the transmission power limit) are not taken into account for a Message 3 (or other uplink scheduled) transmission power calculation.

According to a further example of embodiments of the invention, when in the power ramp-up procedure a change in a parameter, for example in the pathloss, leads to a situation where the calculated preamble transmission power falls back below the maximum limit, the power ramp-up steps which follow are again considered in the transmission power calculation.

Figure 7:
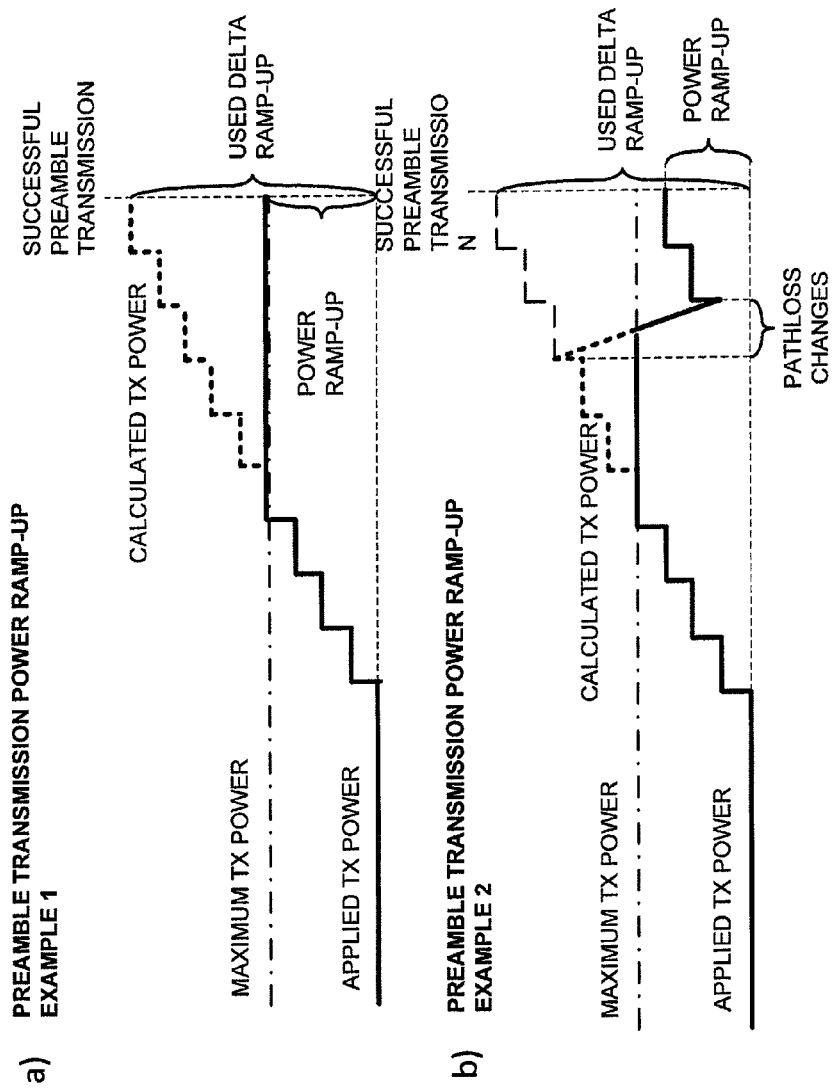
FIGS. 7a and 7b show diagrams explaining a result of an uplink transmission power control scheme in a random access procedure according to examples of an embodiment of the invention.

FIGS. 7a and 7b show two examples how power ramping affects the preamble transmission power. In FIGS. 7a and 7b, the applied transmission power is indicated by a solid line, the calculated transmission power is indicated by a dotted line, and the maximum transmission power (threshold) is indicated by a chain-dotted line.

In the example of FIG. 7a, first the calculated Tx power and the applied TX power matches each other. Then, when the maximum power limit is reached ($P_{CMAX}$ according to the above described formulas), the transmission power is limited. In the example shown in FIG. 7a, this means that the transmission power is limited for the last five transmissions. That is, when calculating the transmission power for the Message 3 (or another uplink scheduled transmission), the parameter $\Delta P_{rampup}$ is limited to have only four steps in the calculation. In other words, a correction is determined and conducted (i.e. a correction parameter or factor may be calculated or an existing parameter may be changed, as described above), which is used in the calculation of the transmission power after receiving a TPC command in the opposite direction. In contrast thereto, according to a conventional calculation process not being based on examples of embodiments of the invention, if the output power is limited with maximum Tx power as shown in FIG. 7a and a conventional power calculation scheme is used, this would result to level over the maximum limit even if a TPC command would try to decrease the accumulated value, so that there would be no direct effect to the applied output power.

In the example shown in FIG. 7b, in addition, the effect of a pathloss change during the preamble transmissions is shown wherein the latest preamble transmission power is not limited by $P_{CMAX}$. Thus, all ramp-up steps following the path loss change are considered and calculated into $\Delta P_{rampup}$.

That is, in the present example of embodiments of the invention, after the RAR is received and if latest calculated preamble transmission power is over $P_{CMAX}$ when using formula:

PREAMBLE_RECEIVED_TARGET_POWER+PL, then $\Delta P_{rampup}$ used in Message 3 (or other uplink scheduled) transmission power calculation is adjusted so that the preamble transmission power formula is equal to $P_{CMAX}$. In other words, a correction is used for adjusting the calculated transmission power.

By means of the present example of embodiments of the invention, it is possible to achieve an immediate response to TPC commands immediately when the RAR is received, also in case UE's uplink transmission power limit is reached or exceeded. That is, in case the calculated Message 3 (or other uplink scheduled) transmission power is over maximum, by applying the correction in the transmission power calculation, a faster and more accurate response to commanded power adjustments for Message 3 (or other uplink scheduled) (re)transmissions and following PUSCH transmissions is achieved. There is also no need for unnecessary TPC commands, which would decrease unnecessary band usage, so that network efficiency can be improved. Also, as UE follows more strictly the networks commanded power adjustments, there is less unexpected interference from the UE.

According to further examples of embodiments of the invention, there may be provided an apparatus comprising a receiving means configured to receive a transmission power control command from a communication network control element, the transmission power control command instructs one of an increase of an uplink transmission power, a decrease of the uplink transmission power, and a maintenance of the uplink transmission power, a transmission power calculating processing means configured to calculate an uplink transmission power for a transmission from a communication network element to the communication network control element, a power control adjustment processing means configured to determine whether the calculated uplink transmission power is above a first threshold value for a transmission power of the communication network element or below a second threshold value for a transmission power of the communication network element, the first threshold value being greater than the second threshold value, wherein, in case it is determined that the calculated uplink transmission power is above the first threshold value or below the second threshold value, the power control adjustment processing means is further configured to determine and conduct a correction for immediately compensating for a difference between the calculated uplink transmission power and the first or second threshold value, and to set an actual transmission power on the basis of the correction by considering the received transmission power control command.

As described above, examples of embodiments of the invention concerning the transmission power control scheme are described to be implemented in user equipments as communication network elements. However, the invention is not limited to this. For example, examples of embodiments of the invention may be implemented in any wireless modems or the like.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means by which a system user or subscriber may experience services from an access network, such as a mobile phone, personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for uplink transmission power control in a communication network. An uplink transmission power for a transmission from a communication network element to a communication network control element is calculated. When a transmission power control command from the communication network control element is received instructing e.g. an increase of the uplink transmission power or a decrease of the uplink transmission power, it is checked whether the calculated uplink transmission power is above a maximum transmission power of the communication network element or below a minimum transmission power of the communication network element. If this is the case, and the transmission power control command instructs a change in the opposite direction, power control adjustment is conducted by determining and conducting a correction for immediately compensating for a difference between the calculated uplink transmission power and the maximum/minimum transmission power, wherein an actual transmission power is set on the basis of the correction parameter considering the received transmission power control command.

Although the present invention has been described herein before with reference to particular embodiments thereof, the present invention is not limited thereto and various modifications can be made thereto.

The invention claimed is:

1. An apparatus for use in controlling a communication network element, the apparatus comprising:
a receiver configured to receive a transmission power control command from a communication network control element, the transmission power control command instructing one of an increase of an uplink transmission power, a decrease of the uplink transmission power, and a maintenance of the uplink transmission power;
a transmission power calculation processing portion configured to calculate an uplink transmission power for a transmission from the communication network element to the communication network control element; and
a power control adjustment processing portion configured to determine whether the calculated uplink transmission power is above a first threshold value for a transmission power of the communication network element or below a second threshold value for a transmission power of the communication network element, the first threshold value being greater than the second threshold value,
wherein, when it is determined that the calculated uplink transmission power is above the first threshold value or below the second threshold value, the power control adjustment processing portion is further configured to determine and conduct a correction for immediately compensating for a difference between the calculated uplink transmission power and the first or second threshold value, and to set an actual transmission power on the basis of the correction by considering the received transmission power control command.

2. The apparatus according to claim 1, wherein when the receiver receives a transmission power control command instructing a decrease of the uplink transmission power and the power control adjustment processing portion determines that the calculated uplink transmission power is above the first threshold value of the transmission power of the communication network element, the power control adjustment processing portion is further configured to determine and conduct a correction which compensates for the positive surplus of the calculated uplink transmission power with regard to the first threshold value and considers the decrease of the uplink transmission power by a value corresponding to the received transmission power control command.

3. The apparatus according to claim 1, wherein when the receiver receives a transmission power control command instructing an increase of the uplink transmission power and the power control adjustment processing portion determines that the calculated uplink transmission power is below the second threshold value of the transmission power of the communication network element, the power control adjustment processing portion is further configured to determine and conduct a correction which compensates for the negative surplus of the calculated uplink transmission power with regard to the second threshold value and considers the increase of the uplink transmission power by a value corresponding to the received transmission power control command.

4. The apparatus according to claim 1, wherein the correction comprises a determination of a new accumulated power control state parameter.

5. The apparatus according to claim 1, wherein the correction is determined such that the actual transmission power is a value corresponding to the first threshold value of the transmission power minus a value corresponding to the received transmission power control command, or a value corresponding to the second threshold value of the transmission power plus a value corresponding to the received transmission power control command.

6. The apparatus according to claim 1, wherein the calculated uplink transmission power is above the first threshold value of the transmission power of the communication network element or below the second threshold value of the transmission power of the communication network element due to a rapid change of a transmission condition parameter affecting a calculation algorithm for the uplink transmission power.

7. The apparatus according to claim 1, wherein the calculated uplink transmission power is above the first threshold value of the transmission power of the communication network element due to a power ramping-up process executed during a random access procedure.

8. The apparatus according to claim 7, wherein the power ramping-up process is executed during a preamble transmission phase of the random access procedure, wherein the calculated uplink transmission power is related to a transmission power used for an uplink scheduled transmission and the transmission power control command is received in a random access response.

9. The apparatus according to claim 8, further comprising a power threshold value crossing determination processing portion configured to:
first determine, during an execution of the power ramping-up process, whether the calculated uplink transmission power exceeds the first threshold value of the transmission power of the communication network element; and
second determine whether the calculated uplink transmission power falls again to a new value being below the first threshold value of the transmission power of the communication network element before receiving the random access response,
wherein when the first and second determinations are positive, the power threshold value crossing determination processing portion is further configured to continue a ramping-up of an applied uplink transmission power from the new value until either the first threshold value of the transmission power is reached again or until the random access response is received.

10. The apparatus according to claim 1, further comprising an activation processing portion configured to receive and process an activation indication from the communication network control element indicating whether the processing conducted by the power control adjustment processing portion is to be executed or not, and to activate or deactivate the power control adjustment processing portion in accordance with the received activation indication.

11. The apparatus according to claim 1, wherein the first threshold value is a maximum transmission power of the communication network element, and the second threshold value is a minimum transmission power of the communication network element.

12. The apparatus according to claim 1, wherein the communication network element is a user equipment comprising the apparatus, and the communication network control element is a base station or evolved node B of a communication system to which the user equipment has access.

13. A method of controlling a communication network element, the method comprising
receiving a transmission power control command from a communication network control element, the transmission power control command instructing one of an increase of an uplink transmission power, a decrease of the uplink transmission power, and a maintenance of the uplink transmission power;
calculating an uplink transmission power for a transmission from the communication network element to the communication network control element; and
conducting a power control adjustment comprising determining whether the calculated uplink transmission power is above a first threshold value for a transmission power of the communication network element or below a second threshold value for a transmission power of the communication network element, the first threshold value being greater than the second threshold value,
wherein, when it is determined that the calculated uplink transmission power is above the first threshold value or below the second threshold value, the power control adjustment further comprises determining and conducting a correction for immediately compensating for a difference between the calculated uplink transmission power and the first or second threshold value, and setting an actual transmission power on the basis of the correction by considering the received transmission power control command.

14. The method according to claim 13, wherein when a transmission power control command instructing a decrease of the uplink transmission power is received and it is determined that the calculated uplink transmission power is above the first threshold value of the transmission power of the communication network element, the power control adjustment further comprises determining and conducting a correction which compensates for the positive surplus of the calculated uplink transmission power with regard to the first threshold value and considers the decrease of the uplink transmission power by a value corresponding to the received transmission power control command.

15. The method according to claim 13, wherein when a transmission power control command instructing an increase of the uplink transmission power is received and it is determined that the calculated uplink transmission power is below the second threshold value of the transmission power of the communication network element, the power control adjustment further comprises determining and conducting a correction which compensates for the negative surplus of the calculated uplink transmission power with regard to the second threshold value and considers the increase of the uplink transmission power by a value corresponding to the received transmission power control command.

16. The method according to claim 13, wherein the correction comprises calculating a new accumulated power control state parameter.

17. The method according to claim 13, wherein the correction is determined such that the actual transmission power is a value corresponding to the first threshold value of the transmission power minus a value corresponding to the received transmission power control command, or a value corresponding to the second threshold value of the transmission power plus a value corresponding to the received transmission power control command.

18. The method according to claim 13, wherein the calculated uplink transmission power is above the first threshold value of the transmission power of the communication network element or below the second threshold value of the transmission power of the communication network element due to a rapid change of a transmission condition parameter affecting a calculation algorithm for the uplink transmission power.

19. The method according to claim 13, wherein the calculated uplink transmission power is above the first threshold value of the transmission power of the communication network element due to a power ramping-up process executed during a random access procedure.

20. The method according to claim 19, wherein the power ramping-up process is executed during a preamble transmission phase of the random access procedure, wherein the calculated uplink transmission power is related to a transmission power used for an uplink scheduled transmission and the transmission power control command is received in a random access response.

21. The method according to claim 20, further comprising:
first determining, during an execution of the power ramping-up process, whether the calculated uplink transmission power exceeds the first threshold value of the transmission power of the communication network element;
second determining whether the calculated uplink transmission power falls again to a new value being below the first threshold value of the transmission power of the communication network element before receiving the random access response; and
when the first and second determinations are positive, continuing a ramping-up of an applied uplink transmission power from the new value until either the first threshold value of the transmission power is reached again or until the random access response is received.

22. The method according to claim 13, further comprising:
receiving and processing an activation indication from the communication network control element indicating whether the power control adjustment processing is to be executed or not; and
activating or deactivating the power control adjustment processing in accordance with the received activation indication.

23. The method according to claim 13, wherein the first threshold value is a maximum transmission power of the communication network element, and the second threshold value is a minimum transmission power of the communication network element.

24. The method according to claim 13, wherein the communication network element is a user equipment conducting the method, and the communication network control element is a base station or evolved node B of a communication system to which the user equipment has access.

25. A computer readable memory storing a computer program comprising a set of instructions, which, when executed by a communication network element, cause the communication network element to perform the steps of claim 13.

* * * * *